United States Patent
Byun

(10) Patent No.: US 11,334,272 B2
(45) Date of Patent: May 17, 2022

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/871,710

(22) Filed: May 11, 2020

(65) Prior Publication Data

US 2021/0096761 A1  Apr. 1, 2021

(30) Foreign Application Priority Data

Oct. 1, 2019 (KR) .......................... 10-2019-0121655

(51) Int. Cl.
*G06F 3/06* (2006.01)
*G06F 12/123* (2016.01)

(52) U.S. Cl.
CPC .......... *G06F 3/0647* (2013.01); *G06F 3/0604* (2013.01); *G06F 3/064* (2013.01); *G06F 3/0659* (2013.01); *G06F 3/0673* (2013.01); *G06F 12/124* (2013.01); *G06F 2212/1044* (2013.01); *G06F 2212/7211* (2013.01)

(58) Field of Classification Search
CPC ...... G06F 3/0647; G06F 3/0604; G06F 3/064; G06F 3/0673; G06F 12/124; G06F 3/0659; G06F 2212/7211; G06F 2212/1044
See application file for complete search history.

(56) References Cited

U.S. PATENT DOCUMENTS

| | | | |
|---|---|---|---|
| 9,947,412 B1* | 4/2018 | Hu | G06F 12/0246 |
| 2017/0010809 A1* | 1/2017 | Hironaka | G06F 3/0665 |
| 2017/0262197 A1* | 9/2017 | Tan | G06F 3/065 |
| 2018/0067863 A1* | 3/2018 | Ki | G06F 12/0891 |
| 2019/0189193 A1* | 6/2019 | Kim | G11C 16/3418 |
| 2019/0294358 A1* | 9/2019 | Suzuki | G06F 3/0611 |
| 2020/0310647 A1* | 10/2020 | Jang | G06F 3/0659 |
| 2020/0334138 A1* | 10/2020 | Byun | G06F 3/0688 |

FOREIGN PATENT DOCUMENTS

| | | |
|---|---|---|
| KR | 10-2017-0095524 | 8/2017 |
| KR | 10-2020-0021821 | 3/2020 |

* cited by examiner

*Primary Examiner* — Sean D Rossiter
(74) *Attorney, Agent, or Firm* — IP & T Group LLP

(57) ABSTRACT

A memory system includes: a memory device including memory blocks for storing data; and a controller suitable for controlling the memory device to increase a first read count for a logical address in a read command corresponding to a read request received from a host, move first data indicated by the logical address from a first memory block to a second memory block among the memory blocks when the first read count is greater than a first threshold value, increase a second read count of the first memory block, and perform a read reclaim operation on the first memory block when the second read count is greater than a second threshold value.

20 Claims, 15 Drawing Sheets

FIG. 8A

| LA | RC_LA |
|---|---|
| LA 1 | 2 |
| LA 2 | 3 |
| LA 3 | 2 |
| LA 4 | 2 |
| LA 5 | 20 |
| LA 6 | 12 |
| LA 7 | 30 |
| LA 8 | 25 |
| ⋮ | ⋮ |
| LA 19 | 5 |
| LA 20 | 5 |

FIG. 8B

| LA | RC_LA |
|---|---|
| LA 1 | 2 |
| LA 2 | 3 |
| LA 3 | 2 |
| LA 4 | 2 |
| LA 5 | 0 |
| LA 6 | 12 |
| LA 7 | 0 |
| LA 8 | 0 |
| ⋮ | ⋮ |
| LA 19 | 5 |
| LA 20 | 5 |

MEMORY SYSTEM AND OPERATING METHOD THEREOF

CROSS-REFERENCE TO RELATED APPLICATION

The present application claims priority on Korean Patent Application No. 10-2019-0121655, filed on Oct. 1, 2019, which is incorporated herein by reference in its entirety.

BACKGROUND

1. Field

Various embodiments of the present invention relate to a memory system, and more particularly, to a memory system capable of reducing the frequency of occurrence of a read reclaim operation, and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Embodiments of the present invention are directed to a memory system that may move data frequently requested to be read to an open super memory block based on the read count of logical addresses.

In accordance with an embodiment of the present invention, a memory system includes: a memory device including memory blocks for storing data; and a controller suitable for controlling the memory device to increase a first read count for a logical address in a read command corresponding to a read request received from a host, move first data indicated by the logical address from a first memory block to a second memory block among the memory blocks when the first read count is greater than a first threshold value, increase a second read count of the first memory block, and perform a read reclaim operation on the first memory block when the second read count is greater than a second threshold value.

In accordance with another embodiment of the present invention, a method for operating a memory system includes: increasing a first read count for a logical address in a read command corresponding to a read request received from an external source; moving first data indicated by the logical address from a first memory block to a second memory block when the first read count is greater than a first threshold value; increasing a second read count of the first memory block; and performing a read reclaim operation on the first memory block when the second read count is greater than a second threshold value.

In accordance with still another embodiment of the present invention, an operating method of a controller for controlling a memory device including first and second super blocks, the first super block having a stripe configured by pages, the operating method includes: counting read-accesses to the first super block and counting read-accesses to the respective pages; moving, when the read-access count of one of the pages becomes greater than a first threshold, valid data from the stripe to the second super block; and controlling when the read-access count of the first super block becomes greater than a second threshold, the memory device to perform a read reclaim operation on the first super block, wherein each of the read-access counts of the pages storing the valid data is greater than a third threshold which is less than the first threshold.

BRIEF DESCRIPTION OF THE DRAWINGS

FIGS. 8A and 8B show tables storing read counts of data for logical addresses.

DETAILED DESCRIPTION

Figure 1:
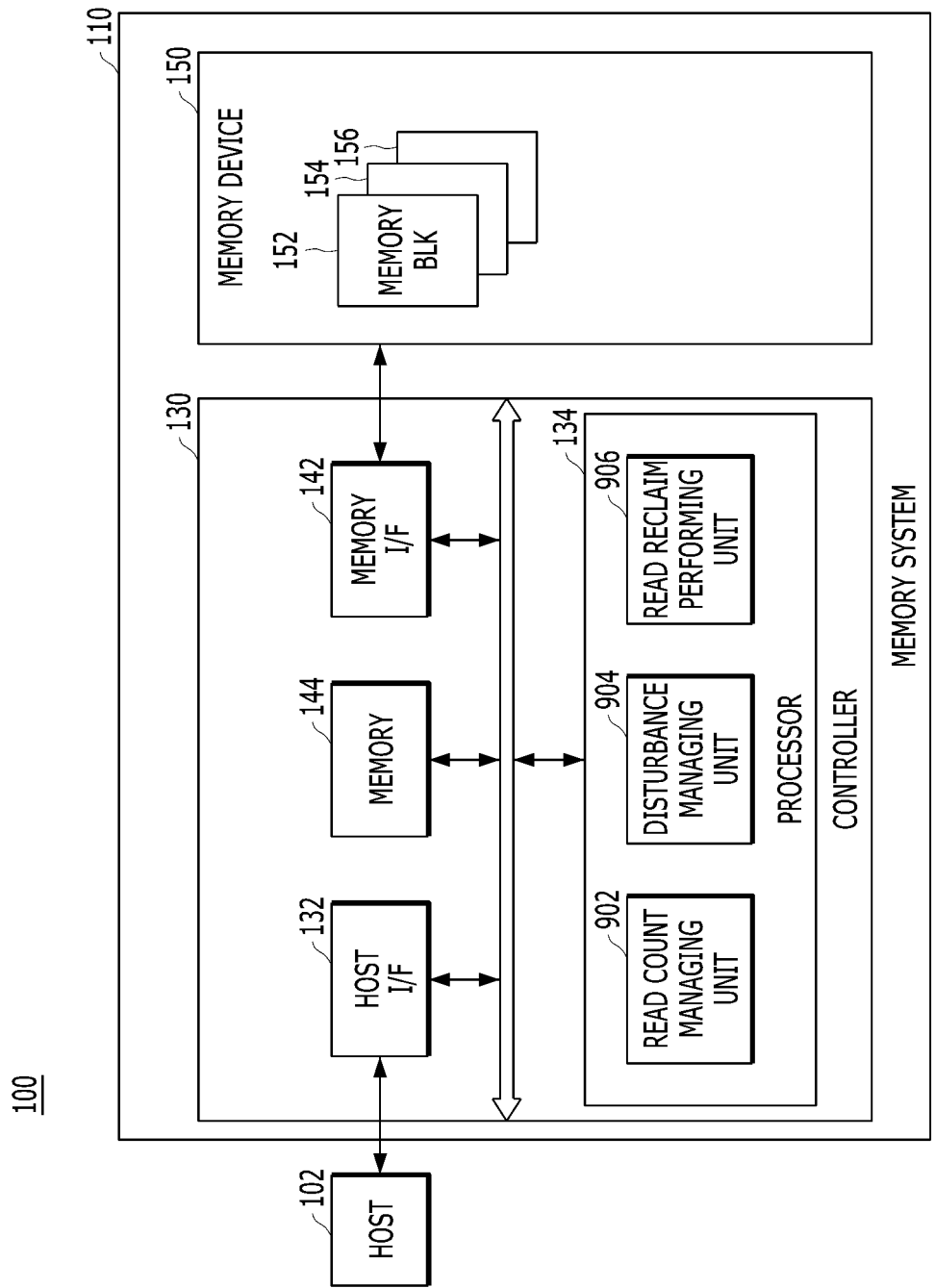
FIG. 1 is a block diagram schematically illustrating an example of a data processing system including a memory system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element that otherwise have the same or similar names. A first element in one instance could be termed a second element in another instance without indicating any change in the element itself.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship of elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The description herein is merely for the purpose of understanding the technical spirit of the present disclosure. Thus, the scope of the present invention should not be limited to the embodiments described herein. As those skilled in the art to which the present invention pertains will understand, various modifications based on the technical spirit of the present disclosure may be made within the scope of the present invention.

Unless otherwise defined, all terms including technical and scientific terms used herein have the same meaning as commonly understood by one of ordinary skill in the art to which the present disclosure belongs. Unless otherwise defined in the present disclosure, the terms should not be construed in an ideal or excessively formal way.

Various embodiments of the present invention are now described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player or a laptop computer, or any of a variety of non-portable electronic devices such as a desktop computer, a game machine, a TV or a projector.

The host 102 may include at least one OS (operating system). The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include any of various types of storage devices. Non-limiting examples of such storage devices include volatile memory devices such as a DRAM dynamic random access memory (DRAM) and/or a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and/or a flash memory.

The memory system 110 may include a memory device 150 and a controller 130.

The controller 130 and the memory device 150 may be integrated into a single semiconductor device, which may be included in any of the various types of memory systems described above. For example, the controller 130 and the memory device 150 may be integrated as a single semiconductor device to constitute an SSD, a PCMCIA (personal computer memory card international association) card, SD card including a mini-SD, a micro-SD and a SDHC, or an UFS device. The memory system 110 may be configured as a part of a computer, a smart phone, a portable game player, or any of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 including a three-dimensional stereoscopic stack structure thereof is described below in more detail with reference to FIGS. 10 to 12.

The controller 130 may control the memory device 150 in response to a request from the host 102. For example, the controller 130 may provide data read from the memory device 150 to the host 102, and store data provided from the host 102 in the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus. As described below with reference to FIG. 9, the processor 134 may include a read count manager 902, a disturbance manager 904, and a read reclaim performing component 906.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and/or integrated drive electronics (IDE). The host interface 132 may be driven via firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data to perform data write and read operations between the host 102 and the memory device 150 and other data for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134. Also, the controller 130 may perform a background operation on the memory device 150 through the processor 134. The background operation performed on the memory device 150 may include copying data stored in some memory blocks among the memory blocks 152 to 156 of the memory device 150 and moving such data into other memory blocks, e.g., a garbage collection (GC) operation, swapping data among select memory blocks of memory blocks 152 to 156, e.g., a wear-leveling (WL) operation, storing the map data stored in the controller 130 in select memory blocks of memory blocks 152 to 156, e.g., a map flush operation, or managing bad blocks of the memory device 150, e.g., a bad block management operation of detecting and processing bad blocks among the memory blocks 152 to 156 in the memory device 150.

Figure 2:
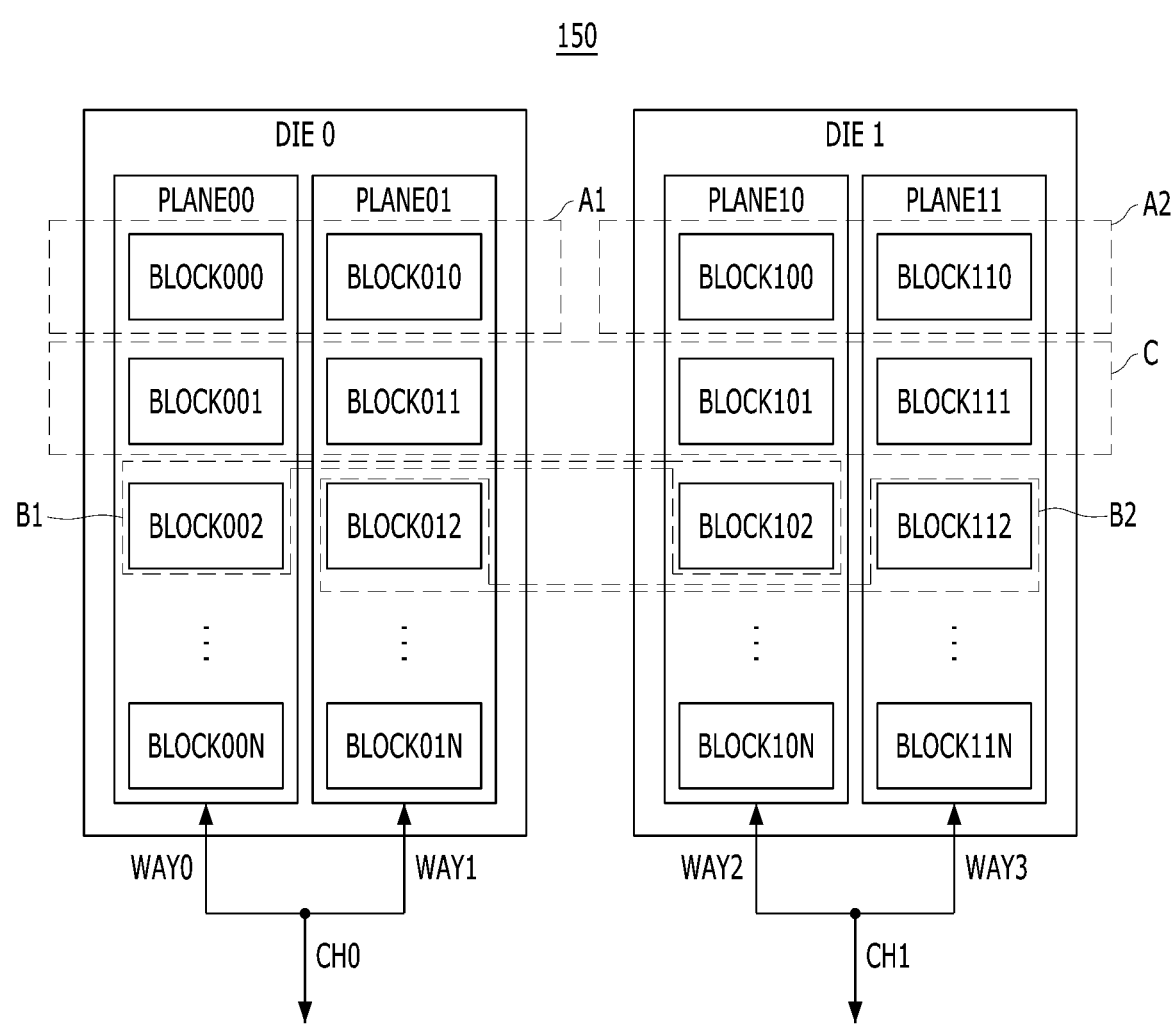
FIG. 2 is a block diagram illustrating a concept of a super memory block used in the memory system in accordance with an embodiment of the present invention.

FIG. 2 is a diagram illustrating a concept of a super memory block used in a memory system in accordance with an embodiment of the present invention.

FIG. 2 illustrates in detail certain elements of the memory device 150, among the elements of the memory system 110 shown in FIG. 1, in accordance with an embodiment of the present invention.

The memory device 150 may include a plurality of memory blocks, e.g., BLOCK000 to BLOCK00N, BLOCK010 to BLOCK01N, BLOCK100 to BLOCK10N and BLOCK110 to BLOCK11N.

In addition, the memory device 150 may include a first memory die DIE0 capable of inputting/outputting data through a zeroth channel CH0 and a second memory die DIE1 capable of inputting/outputting data through a first channel CH1. The zeroth and first channels CH0 and CH1 may input/output data in an interleaving scheme.

The first memory die DIE0 may include a plurality of planes PLANE00 and PLANE01 respectively corresponding to a plurality of ways WAY0 and WAY1. The ways WAY0 and WAY1 may input/output data in the interleaving scheme by sharing the zeroth channel CH0.

The second memory die DIE1 may include a plurality of planes PLANE 10 and PLANE 11 respectively corresponding to a plurality of ways WAY2 and WAY3. The ways WAY2 and WAY3 may input/output data in the interleaving scheme by sharing the first channel CH1.

PLANE00 of DIE0 may include a set number of memory blocks, e.g., BLOCK000 to BLOCK00N, among the plurality of memory blocks.

PLANE01 of DIE0 may include a set number of memory blocks, e.g., BLOCK010 to BLOCK01N, among the plurality of memory blocks.

PLANE10 of DIE1 may include a set number of memory blocks, e.g., BLOCK100 to BLOCK10N, among the plurality of memory blocks.

PLANE11 of DIE1 may include a set number of memory blocks e.g., BLOCK110 to BLOCK11N, among the plurality of memory blocks.

In this manner, the plurality of memory blocks BLOCK000 to BLOCK00N, BLOCK010 to BLOCK01N, BLOCK100 to BLOCK10N and BLOCK110 to BLOCK11N in the memory device 150 may be divided into groups, according to their physical locations and their use of the ways and channels.

Although it is described above that the memory device 150 includes two dies, each including two planes, the invention is not limited to this configuration. The memory device 150 may include any suitable number of dies, each having any suitable number of planes, which numbers may be determined based on system or use requirements. Either or both of such requirements may also be used to determine how many blocks are to be included in each plane.

The memory blocks, however, need not be managed based on their physical locations. Rather, the controller 130 may manage the plurality of memory blocks on a basis of which memory blocks are simultaneously selected and operated. In other words, the controller 130 may manage a plurality of memory blocks which are located in different dies or different planes based on their physical locations, by grouping memory blocks capable of being selected simultaneously and thereby dividing the grouped memory blocks into super memory blocks.

The simultaneous selection scheme of grouping the memory blocks into super memory blocks by the controller 130 may be performed in various ways based on system design or other relevant considerations. Herein, three simultaneous selection schemes are provided by way of example.

A first scheme is to group an arbitrary memory block BLOCK000 from the first plane PLANE00 and an arbitrary memory block BLOCK010 from the second plane PLANE01 of the first memory die DIE0 in the memory device 150 and manage the grouped memory blocks BLOCK000 and BLOCK010 as a single super memory block A1. When this first scheme is applied to the second memory die DIE1, the controller 130 may group an arbitrary memory block BLOCK100 from the first plane PLANE10 and an arbitrary memory block BLOCK110 from the second plane PLANE11 of the second memory die DIE1 and manage the grouped memory blocks BLOCK100 and BLOCK110 as a single super memory block A2.

A second scheme is to group an arbitrary memory block BLOCK002 from the first plane PLANE00 of the first memory die DIE0 and an arbitrary memory block BLOCK102 from the first plane PLANE10 of the second memory die DIE1 and manage the grouped memory blocks BLOCK002 and BLOCK102 as a single super memory block B1. In addition, according to the second scheme, the controller 130 may group an arbitrary memory block BLOCK012 from the second plane PLANE01 of the first memory die DIE0 and an arbitrary memory block BLOCK112 from the second plane PLANE11 of the second memory die DIE1 and manage the grouped memory blocks BLOCK012 and BLOCK112 as a single super memory block B2.

A third scheme is to group an arbitrary memory block BLOCK001 from the first plane PLANE00 of the first memory die DIE0, an arbitrary memory block BLOCK011 from the second plane PLANE01 of the first memory die DIE0, an arbitrary memory block BLOCK101 from the first plane PLANE10 of the second memory die DIE1, and an arbitrary memory block BLOCK111 from the second plane PLANE11 of the second memory die DIE1 and manage the grouped memory blocks BLOCK001, BLOCK011, BLOCK101 and BLOCK111 as a single super memory block C.

The simultaneously-selectable memory blocks in the respective super memory blocks may be substantially simultaneously selected by the controller 130 through an interleaving scheme, for example, a channel interleaving scheme, a memory die interleaving scheme, a memory chip interleaving scheme or a way interleaving scheme.

When a read operation is repeatedly performed on one memory block in a flash memory, read disturbance may occur to change distribution of threshold voltages of the memory cells. The number of error bits in the read data may increase due to the read disturbance, and as the number of the error bits increases, the probability of occurrence of an uncorrectable error may increase as well. A read reclaim operation may include moving valid data stored in a memory block, which is damaged as a result of having been subjected to repetitive read operations, to another normal, i.e., not damaged, memory block based on the read count of the source memory block before the uncorrectable error occurs.

The read reclaim operation is a background operation that is performed internally in a flash memory regardless of a request from a user, and the read reclaim operation involves read and program operations. Since a super memory block is a collection of memory blocks, applying a read reclaim operation to a super memory block may entail moving a large amount of valid data, which may take a long time. Since a foreground operation may be interrupted while the read reclaim operation is performed, the performance of the foreground operation may decrease as the time required for the background operation increases.

Therefore, in order to improve the performance of the foreground operation, the frequency of performing the background operation, e.g., the read reclaim operation, may have to be reduced. According to the prior art, the read reclaim operation may be performed on the super memory block whenever the read count of the super memory block reaches a threshold value, regardless of whether or not frequently read data are stored in the super memory block, as described below with reference to FIG. 3. Therefore, in the case of the prior art, the frequency of performing the background operation may be high, thereby contributing to deterioration of the performance of the foreground operation.

Figure 3:
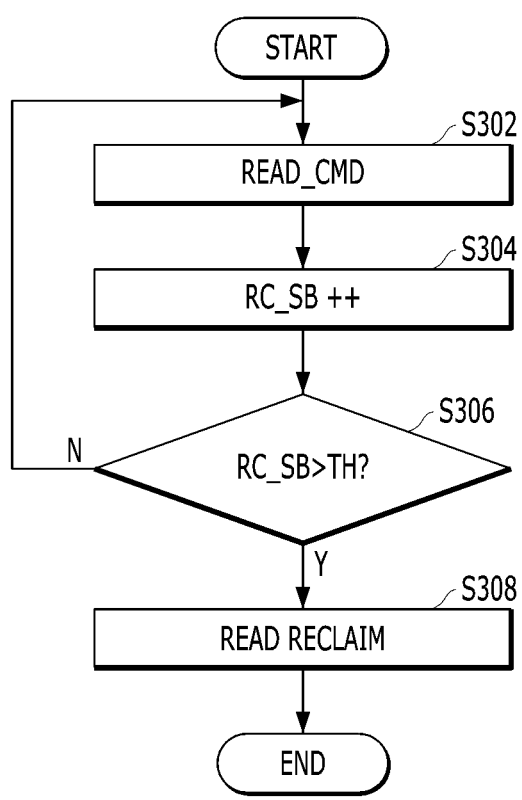
FIG. 3 is a flowchart describing a read reclaim operation according to the prior art.

FIG. 3 is a flowchart describing a read reclaim operation according to the prior art.

In step S302, a controller of a memory system may control the associated memory device to perform a read operation in response to a read command READ_CMD. The read command READ_CMD may include a logical address, which the controller may convert into a physical address and provide the memory device with the physical address. The memory device may read the data stored in a page of a memory block based on the physical address.

In step S304, the controller may increase the read count RC_SB for the super memory block containing the memory block from which the data is read in step S302. As described above with reference to FIG. 2, the super memory block may include a plurality of memory blocks, and the read count RC_SB may be increased whenever data is read from a page in a memory block among the memory blocks in that super memory block.

In step S306, the controller may compare the read count RC_SB with a threshold value TH. When the read count RC_SB is equal to or less than the threshold value TH ('N' in step S306), the controller may repeatedly perform the operations of steps S302 to S306.

In step S308, when the read count RC_SB is greater than the threshold value TH ('Y' in step S306), the controller may control the memory device to perform a read reclaim operation (READ RECLAIM) on the super memory block. According to the read reclaim operation, the memory device may move the valid data stored in the super memory block to an open super memory block.

The read reclaim operation described with reference to FIG. 3 is not limited to a case in which the memory device manages the memory blocks by grouping the memory blocks into super memory blocks, but may also be performed on individual memory blocks. For example, the controller may control the memory device to perform the read reclaim operation of moving the valid data stored in a memory block whose read count is greater than a threshold value to an open memory block.

Figure 4A:
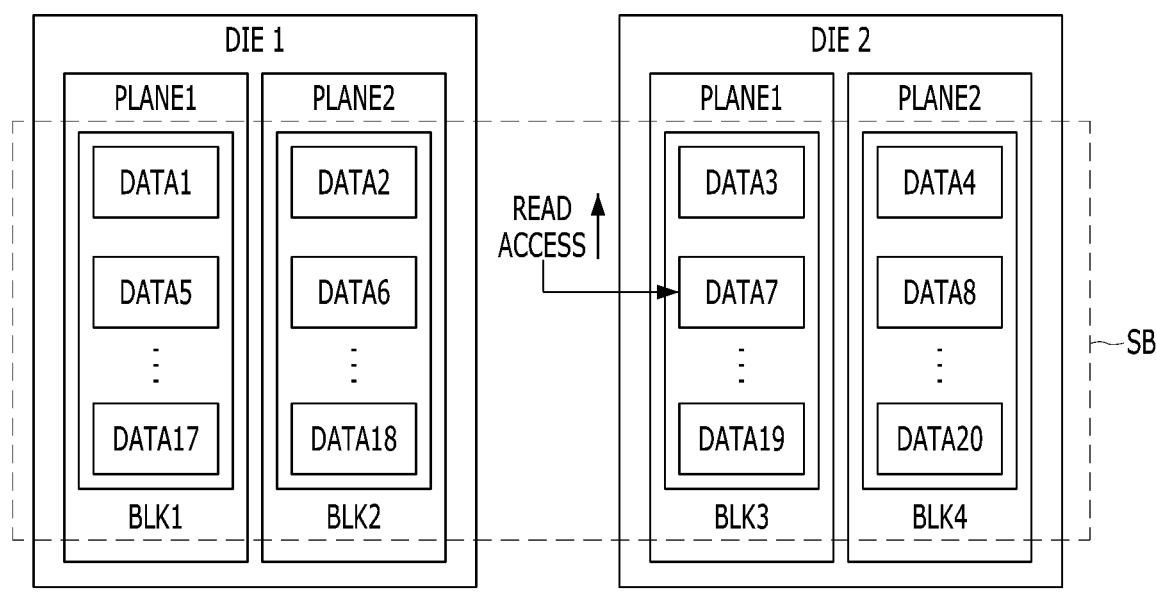
FIGS. 4A and 4B are block diagrams illustrating a problem of the read reclaim operation according to the prior art.
Figure 4B:
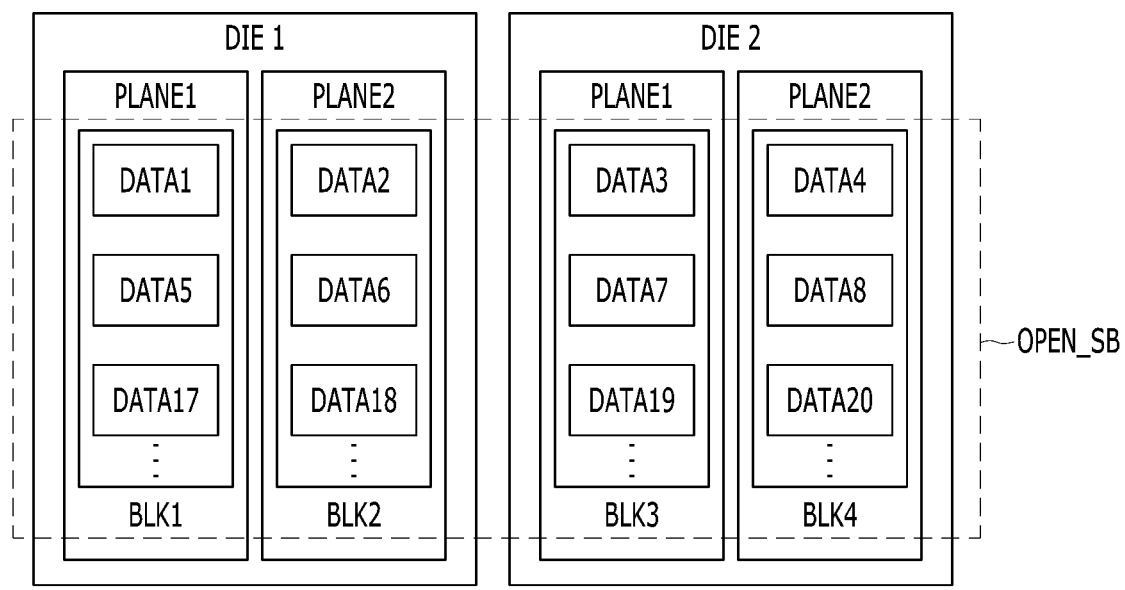

FIGS. 4A and 4B are block diagrams illustrating a problem of the read reclaim operation according to the prior art.

A super memory block SB and an open super memory block OPEN_SB illustrated in FIGS. 4A and 4B may individually include first to fourth memory blocks BLK1 to BLK4. The first and second memory blocks BLK1 and BLK2 may be included in the first and second planes PLANE1 and PLANE2 of the first memory die DIE1, respectively, and the third and fourth memory blocks BLK3 and BLK4 may be included in the first and second planes PLANE1 and PLANE2 of the second memory die DIE2, respectively.

By way of example, it is assumed that the super memory block SB shown in FIG. 4A stores first to $20^{th}$ pieces of data, e.g., DATA1 to DATA20, which correspond to first to $20^{th}$ logical addresses LA1 to LA20, respectively.

As described above with reference to FIG. 3, the controller may increase the read count RC_SB for the super memory block whenever data stored in the super memory block SB is read, and when the read count RC_SB is greater than a threshold value TH, the controller may control the memory device to perform a read reclaim operation on the super memory block SB. When the host repeatedly provides the memory system with a read command including a particular logical address, the read count of the super memory block including the data indicated by the particular logical address may greatly increase. For example, when the controller repeatedly receives a read command including the seventh logical address LA7, the read count of the super memory block SB storing the seventh data DATA7 indicated by the seventh logical address LA7 may be greatly increased as a result. When the read count continues to increase to the point at which it becomes greater than the threshold value, the controller may move all the valid data stored in the super memory block SB to the open super memory block OPEN_SB.

FIG. 4B is a diagram illustrating the open super memory block OPEN_SB storing the valid data moved from the super memory block SB.

The controller may control the memory device to perform a read reclaim operation of reading all the valid data stored in the super memory block SB from the super memory block SB and programming the read valid data in the open super memory block OPEN_SB. The open super memory block OPEN_SB may indicate a super memory block in which a program operation is being performed currently, and the controller may perform an erase operation on the super memory block in which data is periodically stored and allocate an open super memory block OPEN_SB for programming new data. During the read reclaim operation, the memory device may not perform the foreground operation according to a host request, and thus the performance of the foreground operation may be deteriorated. In the case of the read reclaim for the super memory block, since the size of data to be moved is large, the performance deterioration of the foreground operation may be further exacerbated.

According to the prior art, data indicated by a logical address for which a read request occurs frequently may remain in the super memory block until a read reclaim operation is performed on that super memory block. Therefore, a read reclaim operation for that super memory block may occur frequently due to the frequently-requested data therein. As a result, the performance of a foreground operation may be deteriorated, which is problematic.

According to an embodiment of the present invention, the controller 130 may reduce the frequency at which the read reclaim operation is performed, which deteriorates the performance of the foreground operation, by moving in advance the frequently read data from the super memory block in which such data presently resides to another super memory block based on the read count corresponding to a logical address. In this description, a read count corresponding to a logical address or a read count corresponding to data may be a read count of a storage region storing the data indicated by the logical address. For example, the storage region may be a page and the logical address may indicate the page.

The problem described above in the context of a super memory block may also occur in individual memory blocks as well. For example, since the read count of a memory block storing data that is frequently requested to be read may increase drastically, the read reclaim operation may be frequently performed on that memory block. The increase in the frequency at which the read reclaim operation is performed on that memory block may, in turn, deteriorate the performance of a foreground operation that is interrupted as a result of the read reclaim operation. Thus, in another embodiment, the read reclaim control scheme may be applied on an individual memory block basis, rather than on a super memory block basis.

FIGS. 5A to 5E are block diagrams illustrating a read reclaim operation in accordance with an embodiment of the present invention.

Figure 5A:
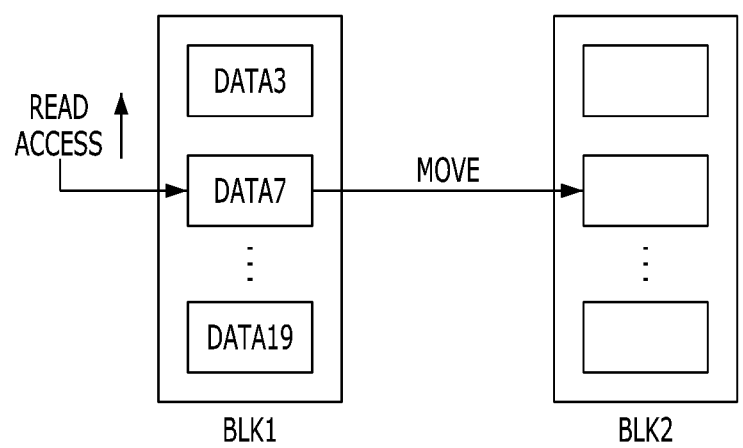
FIGS. 5A to 5E are block diagrams illustrating a read reclaim operation in accordance with an embodiment of the present invention.

According to an embodiment of the present invention, when the first read count corresponding to the logical address is greater than the first threshold value, the controller 130 may move the data to the second memory block BLK2. FIG. 5A illustrates an operation of moving the data from the first memory block BLK1 to the second memory block BLK2 in accordance with an embodiment of the present invention. For example, as illustrated in FIG. 5A, when the first read count corresponding to the seventh logical address LA 7 indicating frequently read data is greater than the first threshold value, among the first read counts corresponding to logical addresses indicating respective pieces of data stored in the first memory block BLK1, the controller 130 may move seventh data DATA7 indicated by the seventh logical address LA 7 to the second memory block BLK2. The controller 130 may lower the frequency at which a read reclaim operation is performed, as well as lower the rate at which a second read count of the first memory block BLK1 increases, by moving the frequently-read data (e.g., DATA7 indicated by LA 7) from the first memory block BLK1 to the second memory block BLK2.

Figure 5B:
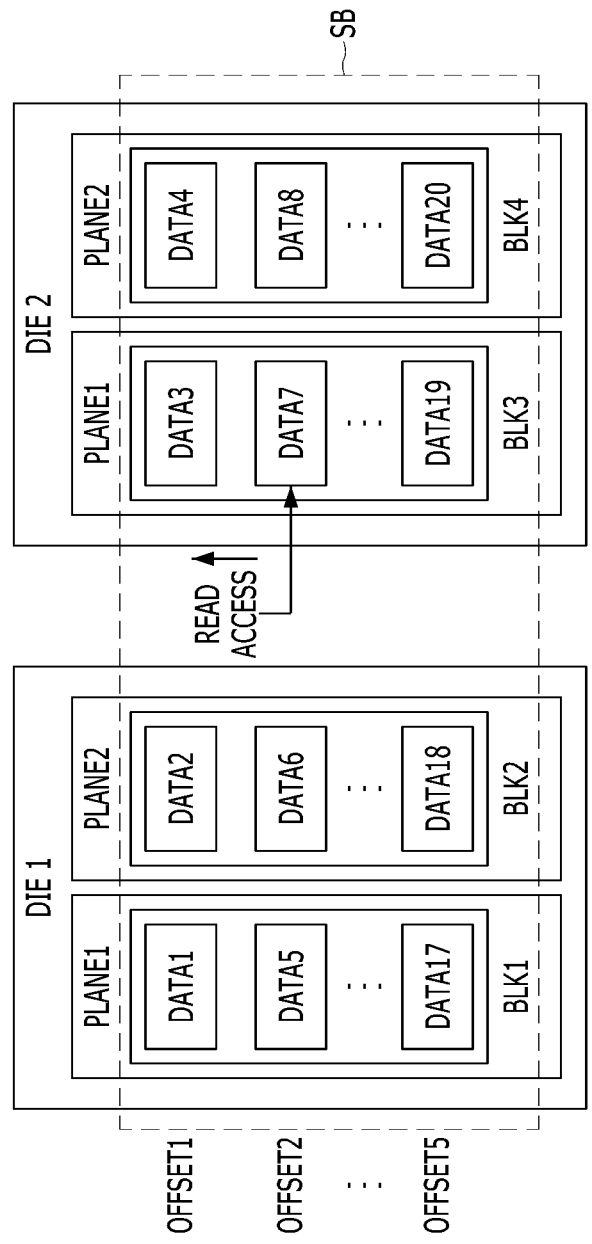

FIG. 5B illustrates a first super memory block SB having the same condition as the super memory block described above with reference to FIG. 4A. The pages located in a first offset OFFSET1 of the first super memory block may store first to fourth data DATA1 to DATA4, respectively, and the pages located in a second offset OFFSET2 may store fifth to eighth data DATA5 to DATA8, respectively. The pages located in a fifth offset OFFSET5 may store 17th to 20th data DATA17 to DATA20, respectively.

According to an embodiment of the present invention, when the first read count corresponding to the logical address is greater than the first threshold value, the controller 130 may move the data to the second super memory block OPEN_SB.

Figure 5C:
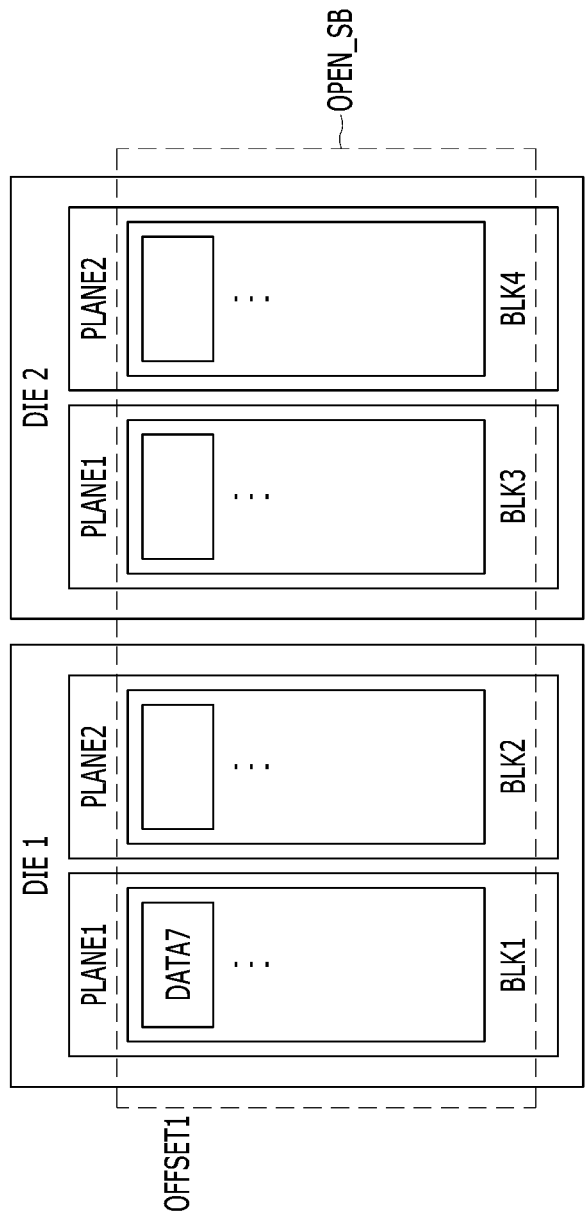

FIG. 5C is a diagram illustrating a second super memory block OPEN_SB storing the valid data moved from the first super memory block SB in accordance with an embodiment of the present invention. For example, as shown in FIG. 5C, when the first read count corresponding to the seventh logical address LA 7 which is frequently requested to be read is greater than the first threshold value, the controller 130 may move the seventh data DATA7 indicated by the seventh logical address LA 7 to the second super memory block OPEN_SB. The controller 130 may lower the frequency at which a read reclaim operation is performed, as well as lower the rate at which the second read count of the first super memory block SB increases, by moving the data frequently requested to be read from the first super memory block SB to the second super memory block OPEN_SB.

Also, the controller 130 may move, to the second super memory block OPEN_SB, not only the frequently-read data, but other data stored in the same stripe as the frequently-read data. The pages included in the same offset in the super memory block may represent a single stripe.

When the host 102 requests the memory system 110 to store a discrete amount of data having a tendency to simultaneously accessed, the memory system 110 may program the data in a super memory block on the basis of a stripe. Therefore, the data stored in a single stripe is likely to be simultaneously accessed. For example, by programming data in units of stripes as described above, data likely to be simultaneously requested by the host 102 is maintained together in the same unit. Therefore, when a portion of the data stored in a single stripe needs to be moved according to a background operation, the controller 130 may move all of the data stored in the stripe thereby retaining the capability of quickly responding to a subsequent access request from the host 102 for simultaneously requested data.

For example, the fifth, sixth, and eighth data DATA5, DATA6, and DATA8 stored in the same stripe as the seventh data DATA7 indicated by the seventh logical address LA 7 may have a high spatial locality (i.e., have a tendency to be simultaneously accessed) with the seventh data DATA7. Therefore, when the seventh data DATA7 indicated by the seventh logical address LA 7 is frequently requested to be read, the other data DATA5, DATA6 and DATA8 having the high spatial locality with the seventh data DATA7 may also be highly likely to be frequently requested to be read as well.

According to an embodiment of the present invention, the controller 130 may move frequently-read data, as well as other data in the same stripe as the frequently-read data, from a first super memory block to a second super memory block. The data may be so moved according to an interleaving scheme. Therefore, all such data is kept together to retain the capability to quickly respond to a subsequent access request for such data still even after moving the frequently-read data from the first super memory block to the second memory block.

To be specific, when the first read count corresponding to a logical address is greater than the first threshold value, the controller 130 may detect valid data among second data stored in the same stripe as the first data indicated by the logical address. The controller 130 may control the memory device 150 to move the first data and the detected valid data to the second super memory block OPEN_SB according to the interleaving scheme.

Figure 5D:
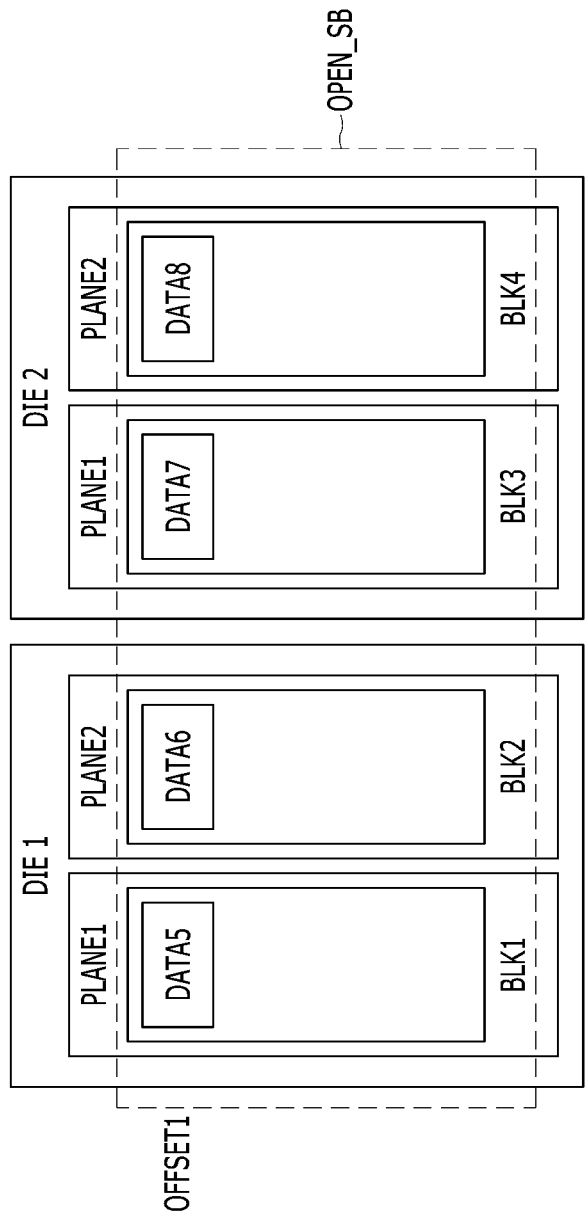

FIG. 5D is a diagram illustrating the second super memory block OPEN_SB storing the valid data moved from the first super memory block SB in accordance with an embodiment of the present invention. For example, as illustrated in FIG. 5D, since the first read counts for the fifth, sixth, and eighth logical addresses LA5, LA6, and LA8 are more likely to be greater than the first threshold value within a short period of time, the controller 130 may move the fifth, sixth, and eighth data DATA5, DATA6, and DATA8 together with the seventh data DATA7 to the second super memory block OPEN_SB according to the interleaving method.

According to an embodiment of the present invention, among the remaining valid data stored in the same stripe as the first data, only the valid data corresponding to the first read counts greater than a third threshold value may be moved to the second super memory block OPEN_SB. Depending on the spatial locality, there is a high probability that the read request frequency for the data stored in the same stripe may be similar, but there may be data having a low read request frequency among the data stored in the same stripe. Therefore, according to an embodiment of the present invention, only the data having a high read request frequency may be moved to the second open super memory block OPEN_SB. The third threshold may be less than the first threshold.

For example, when the first read counts for the respective fifth and eighth logical addresses LA5 and LA8 are greater than the third threshold value and the first read count corresponding to the sixth logical address LA6 is equal to or less than the third threshold value, the controller 130 may control the memory device 150 to move the seventh data DATA7 indicated by the seventh logical address LA 7 to the second super memory block OPEN_SB as well as move the fifth and eighth data DATA5 and DATA8 respectively indicated by the fifth and eighth logical addresses LA5 and LA8 to the second super memory block OPEN_SB according to the interleaving scheme, whereas the sixth data DATA6 indicated by the sixth logical address LA6 may not be moved.

Figure 5E:
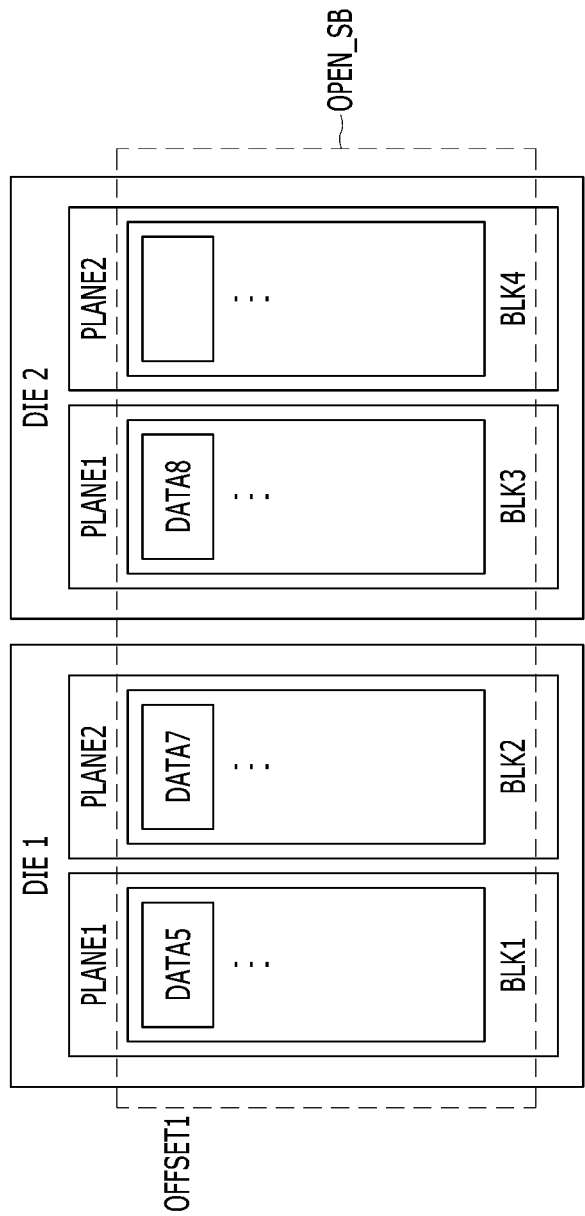

FIG. 5E illustrates an open super memory block OPEN_SB storing the valid data moved from the super memory block SB in accordance with an embodiment of the present invention. As described above, the controller 130 may move DATA5 and DATA8, which are valid data each having a first read count greater than the third threshold value, among DATA5, DATA6 and DATA8 stored in the same stripe as DATA 7, to the open super memory block OPEN_SB together with DATA 7, which also has a first read count greater than the first threshold value. Therefore, the rate at which the read count of the super memory block SB increases may be lowered, and the performance deterioration of the foreground operation may be prevented by lowering the frequency at which a read reclaim operation is performed on super memory block SB.

Figure 6:
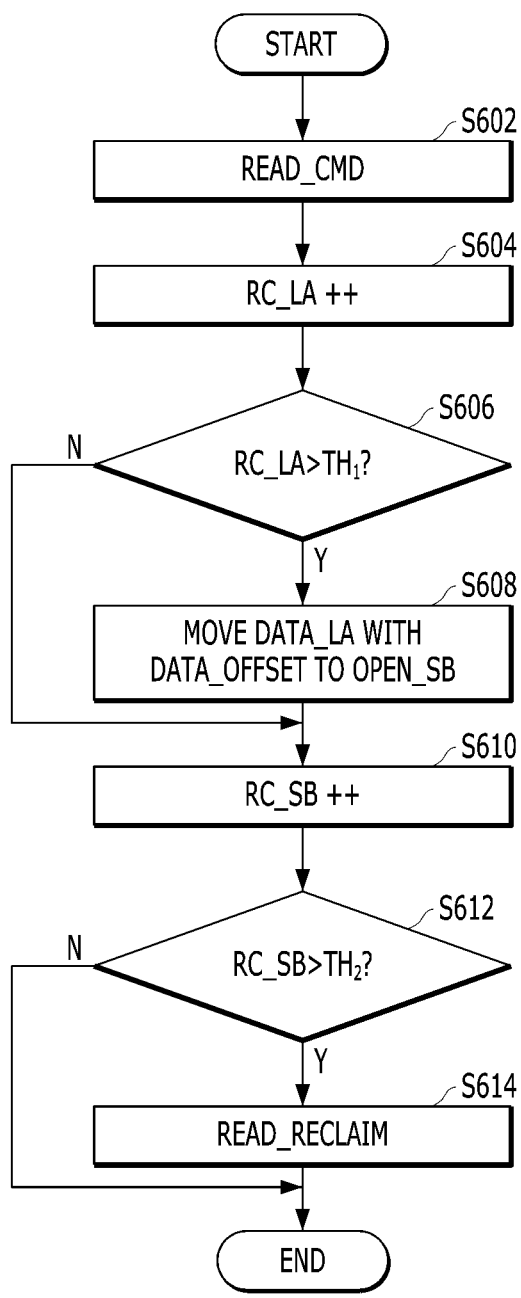
FIG. 6 is a flowchart describing an operation of the memory system 110 in accordance with an embodiment of the present invention.

FIG. 6 is a flowchart describing an operation of the memory system 110 in accordance with an embodiment of the present invention.

In step S602, the controller 130 may receive a read command READ_CMD from the host 102. The read command READ_CMD may include a logical address, and the controller 130 may convert the logical address into a physical address. The controller 130 may control the memory device 150 to read data from a first super memory block indicated by the physical address.

In step S604, the controller 130 may increase a first read count RC_LA for the logical address indicating the read data in response to the read command READ_CMD provided in step S602. As described below with reference to FIGS. 8A and 8B, the controller 130 may store a table representing the read count RC_LA corresponding to the logical address. Whenever a read command READ_CMD is provided, the controller 130 may update the table by increasing the first read count RC_LA corresponding to the logical address included in the read command READ_CMD.

In step S606, the controller 130 may compare the first read count RC_LA corresponding to the logical address, which was increased in step S604, with the first threshold value TH1. According to an embodiment of the present invention, the controller 130 may detect frequently-read data by comparing the first read count RC_LA corresponding to the logical address with the first threshold value TH1.

In step S608, when the first read count RC_LA corresponding to the logical address is greater than the first threshold value TH1 ('Y' in step S606), the controller 130 may control the memory device 150 to move data DATA_LA indicated by the logical address and second data DATA_OFFSET stored in the same stripe as the data DATA_LA from the first super memory block to the second super memory block OPEN_SB. To be specific, the controller 130 may control the memory device 150 to move data DATA_OFFSET_MOVE, which are valid data corresponding to first read counts greater than the third threshold value TH3, among the second data DATA_OFFSET stored in the same stripe as the data DATA_LA, from the first super memory block to the second super memory block OPEN_SB according to the interleaving scheme.

Figure 7:
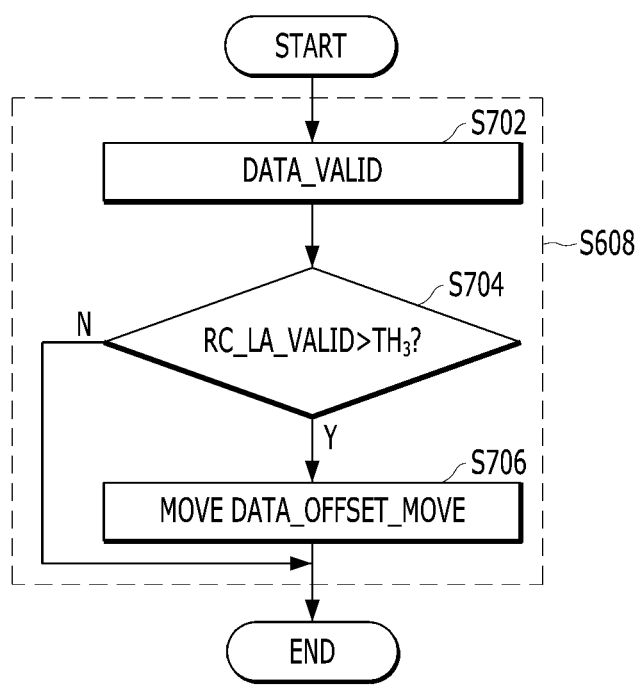
FIG. 7 is a flowchart describing a detailed operation of step S608 of FIG. 6.

FIG. 7 is a flowchart describing a detailed operation of step S608.

In step S702, when the first read count RC_LA corresponding to the first data DATA_LA is greater than the first threshold value TH1 ('Y' in step S606), the controller 130 may detect valid data DATA_VALID among the second data stored in the same stripe as the first data DATA_LA. The valid data DATA_VALID may include a plurality of data pieces respectively indicated by a plurality of logical addresses.

In step S704, the controller 130 may compare the first read counts RC_LA_VALID respectively corresponding to the pieces of valid data DATA_VALID identified in step S702 with the third threshold value TH3. The third threshold value TH3 may be less than the first threshold value TH1. Along with the first data DATA_LA, the controller 130 may control the memory device 150 to move, to the second super memory block OPEN_SB, only the pieces of valid data DATA_OFFSET_MOVE having first read counts greater than the third threshold value TH3.

In step S706, the controller 130 may move, together with the first data DATA_LA, the pieces of valid data DATA_OFFSET_MOVE having first read counts greater than TH3, as determined in step S704, from the first super memory block to the second super memory block OPEN_SB. When frequently-requested data is moved, the second read count of the first super memory block may increase more slowly than before the frequently-requested data is moved. Therefore, read disturbance of the first super memory block may be prevented by moving only the frequently-requested data instead of moving the entire data of the first super memory block. Therefore, the time required for the background operation may be reduced and the performance of the foreground operation may be improved.

Referring back to FIG. 6, in step S610, the controller 130 may increase the second read count RC_SB of the first super memory block. In step S612, the controller 130 may compare the second read count RC_SB of the first super memory block with the second threshold value TH2. In step S614, when the second read count RC_SB of the first super memory block is greater than the second threshold value TH2 ('Y' in step S612), the controller 130 may control the memory device 150 to perform a read reclaim operation READ_RECLAIM on the first super memory block.

FIGS. 8A and 8B show tables storing first read counts respectively corresponding to pieces data stored in the first super memory block.

Referring to FIG. 8A, the controller 130 may store a table that stores the first read counts RC_LA in association with respective logical addresses indicating respective pieces of data stored in the memory 144. The number of entries, i.e., LA/RC_LA pairs, that may be stored in the table may be limited. When the table becomes full of entries, the controller 130 may evict the oldest entry from the table according to a Least Recently Used (LRU) scheme.

The table shown in FIG. 8A shows logical addresses LA indicating pieces of data stored in a super memory block SB described above with reference to FIGS. 5A and 5D and first read counts RC_LA respectively corresponding to the logical addresses LA. It may be seen from the table that the first read counts RC_LA for the fifth to eighth logical addresses LA5 to LA8, which have relatively high and similar values, may indicate data stored in the same stripe (e.g., the stripe of the second offset OFFSET2 as illustrated in FIG. 5B) and thus may have high spatial locality with one another.

FIG. 8B illustrates a table that is updated after the fifth and eighth data DATA5 and DATA8 respectively indicated by the fifth and eighth logical addresses LA 5 and LA 8 and having first read counts RC_LA greater than the third threshold value TH3 are moved together with the seventh data DATA7 to the second super memory block OPEN_SB among the valid data stored in the same stripe as the seventh data DATA7. The controller 130 may update the table by resetting the first read count corresponding to a logical address whenever data indicated by that logical address is moved to another super memory block. For example, the controller 130 may reset the first read counts RC_LA corresponding to the fifth, seventh, and eighth logical addresses LA5, LA7, and LA8 to have a value of '0' after DATA5 and DATA8 are moved together with DATA7 to the second super memory block OPEN_SB.

Figure 9:
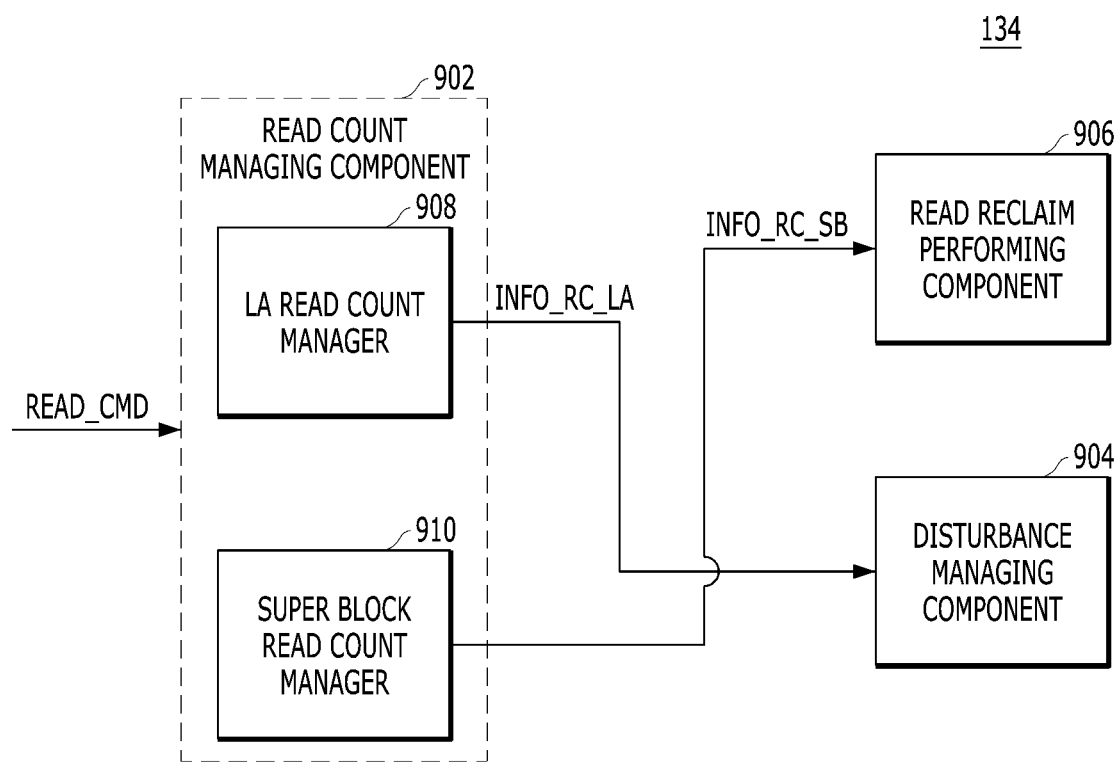
FIG. 9 is a block diagram illustrating a detailed structure of a processor in accordance with an embodiment of the present invention.

FIG. 9 is a block diagram illustrating a detailed structure of a processor 134 in accordance with an embodiment of the present invention.

The processor 134 may include a read count managing component 902, a disturbance managing component 904, and a read reclaim manager 906. The read count managing component 902 may include a logical address read count manager 908 and a super block read count manager 910.

The read count managing component 902 may control the second read count of the first super memory block and the first read counts corresponding to respective logical addresses based on the received read commands. The read count managing component 902 may provide the read reclaim performing component 906 with read count information INFO_RC_SB representing the second read count of the first super memory block. The read count manager 902 may provide the disturbance managing component 904 with information INFO_RC_LA representing the first read count corresponding to the logical address of data associated with each command that is received.

The logical address read count manager 908 may increment the first read count corresponding to the logical address included in the read command READ_CMD, and store the first read count in a table, such as that described with reference to FIGS. 8A and 8B. The logical address read count manager 908 may record a logical address and a first read count corresponding to the logical address in the table and may reset that first read count whenever the data indicated by that logical address is moved to another super memory block. Also, the logical address read count manager 908 may evict an entry of a logical address and its corresponding first read count from the table according to the LRU scheme, when the number of logical addresses recorded in the table exceeds a fourth threshold value. The logical address read count manager 908 may provide the disturbance managing component 904 with the information INFO_RC_LA representing the first read count.

The super block read count manager 910 may control the second read count of the first super memory block. The super block read count manager 910 may increase the second read count whenever data is read from the first super memory block. The super block read count manager 910 may provide the read reclaim performing component 906 with information INFO_RC_SB representing the second read count.

The disturbance managing component 904 may detect data to be moved from the first super memory block to the second super memory block based on the provided information INFO_RC_LA representing the first read count corresponding to the first data. The second super memory block may be the open super memory block. The disturbance managing component 904 may compare the first read count corresponding to the first data with the first threshold value. When the first read count corresponding to the first data is greater than the first threshold value, the disturbance managing component 904 may compare the first read count corresponding to the second data stored in the same stripe as the first data with the third threshold value. The disturbance managing component 904 may detect valid data corresponding to the first read counts greater than the third threshold value among the second data. The disturbance managing component 904 may control the memory device to move the first data and the detected valid data to the second super memory block according to the interleaving scheme.

The read reclaim performing component 906 may control the memory device 150 to perform a read reclaim operation on the first super memory block based on the provided information INFO_RC_SB representing the second read count of the first super memory block. When the second read count of the first super memory block is greater than the second threshold value, the read reclaim performing component 906 may control the memory device 150 to perform a read reclaim operation by moving the valid data from the first super memory block to another super memory block (e.g., the second super memory block).

According to an embodiment of the present invention, the frequency at which a read reclaim operation is performed may be reduced by moving frequently-requested data, along with data stored in pages located at the same offset as the page in which the frequently-requested data are stored, to an open super memory block according to an interleaving scheme.

While the present invention has been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system, comprising:
   a memory device including memory blocks for storing data; and
   a controller suitable for controlling the memory device to:
   increase a first read count for a logical address corresponding to a read command from a host, wherein the first read count counts a number of times that first data associated with the logical address is read,
   move the first data indicated by the logical address from at least one page in a first memory block to a second memory block among the memory blocks when the first read count is greater than a first threshold value,
   increase a second read count corresponding to the first memory block, wherein the second read count counts a number of times that the first memory block is read, and
   perform a read reclaim operation on the first memory block when the second read count is greater than a second threshold value.

2. The memory system of claim 1, wherein the memory blocks are grouped into a plurality of super memory blocks, each of which includes a plurality of memory blocks, and
   wherein the controller controls the memory device to move the first data and second data stored at a same offset as the first data within a first super memory block, to a second super memory block according to an interleaving scheme.

3. The memory system of claim 2, wherein the second data are valid data.

4. The memory system of claim 3, wherein each of the first read counts for logical addresses respectively corresponding to the valid data is greater than a third threshold value, and
   the third threshold value is less than the first threshold value.

5. The memory system of claim 1, wherein the controller increases the second read count whenever data stored in the first memory block are read.

6. The memory system of claim 1, wherein the controller increases the first read count for a particular logical address whenever a read command containing the particular logical address is received.

7. The memory system of claim 1, wherein the controller stores a table that records first read counts for respective logical addresses, and resets the first read count for a particular logical address when data corresponding to the particular logical address is moved to another memory block.

8. The memory system of claim 7, wherein when the number of logical addresses recorded in the table reaches a fourth threshold value, the controller evicts one or more of the logical addresses recorded in the table according to a Least Recently Used (LRU) scheme.

9. The memory system of claim 1, wherein the read reclaim operation is an operation of moving valid data in the first memory block to the second memory block.

10. The memory system of claim 2, wherein the interleaving scheme moves the second data to the second super memory block while moving the first data to the second super memory block.

11. A method for operating a memory system, comprising:
    increasing a first read count for a logical address corresponding to a read command from an external source, wherein the first read count counts a number of times that first data associated with the logical address is read;
    moving the first data indicated by the logical address from at least one page in a first memory block to a second memory block when the first read count is greater than a first threshold value;
    increasing a second read count corresponding to the first memory block, wherein the second read count counts a number of times that the first memory block is read; and
    performing a read reclaim operation on the first memory block when the second read count is greater than a second threshold value.

12. The method of claim 11, wherein the moving of the first data includes moving the first data and second data, which are stored at the same offset as the first data, to a second super memory block including the second memory block according to an interleaving scheme.

13. The method of claim 12, wherein the second data are valid data.

14. The method of claim 13, wherein each of the first read counts for logical addresses respectively corresponding to the valid data is greater than a third threshold value, which is less than the first threshold value.

15. The method of claim 11, further comprising: increasing the second read count whenever data stored in the first memory block is read.

16. The method of claim 11, further comprising: increasing the first read count for a particular logical address whenever a read command containing the particular logical address is received.

17. The method of claim 11, further comprising:
    storing a table that records first read counts for respective logical addresses, and resetting the first read count for a particular logical address when data corresponding to the particular logical address is moved to another memory block.

18. The method of claim 17, further comprising evicting one or more of the logical addresses recorded in the table according to a Least Recently Used (LRU) scheme when the number of logical addresses recorded in the table reaches a fourth threshold value.

19. The method of claim 11, wherein the read reclaim operation is performed by moving valid data in the first memory block to the second memory block.

20. An operating method of a controller for controlling a memory device including first and second super blocks, the first super block having a stripe configured by pages, the operating method comprising:
  counting read-accesses to the first super block to generate a first read-access count and counting read-accesses to the respective pages to generate a second read-access count, wherein the second read-access count counts a number of times that first data associated with the logical address is read and the first read-access count counts a number of times that the first memory block is read;
  moving, when the second read-access count for one of the pages becomes greater than a first threshold, the first data from the stripe to the second super block; and
  controlling, when the first read-access count for the first super block becomes greater than a second threshold, the memory device to perform a read reclaim operation on the first super block,
  wherein each of the second read-access counts of the pages storing the valid data is greater than a third threshold which is less than the first threshold.

* * * * *